United States Patent
Brostrom et al.

(10) Patent No.: US 9,157,439 B2
(45) Date of Patent: Oct. 13, 2015

(54) UNIVERSAL OIL FITTING

(75) Inventors: Troy R. Brostrom, Lima, OH (US); Gregg M. Hemmelgarn, Yorkshire, OH (US)

(73) Assignee: Emerson Climate Technologies, Inc., Sidney, OH (US)

( * ) Notice: Subject to any disclaimer, the term of this patent is extended or adjusted under 35 U.S.C. 154(b) by 589 days.

(21) Appl. No.: 13/047,383

(22) Filed: Mar. 14, 2011

(65) Prior Publication Data

US 2011/0243773 A1 Oct. 6, 2011

Related U.S. Application Data

(60) Provisional application No. 61/319,122, filed on Mar. 30, 2010.

(51) Int. Cl.
| | |
|---|---|
| F04C 23/00 | (2006.01) |
| E21B 17/042 | (2006.01) |
| F04B 39/12 | (2006.01) |
| F04C 29/02 | (2006.01) |
| F16L 15/00 | (2006.01) |
| F04C 18/02 | (2006.01) |

(52) U.S. Cl.
CPC ............. *F04C 23/008* (2013.01); *E21B 17/042* (2013.01); *F04B 39/121* (2013.01); *F04B 39/123* (2013.01); *F04C 29/028* (2013.01); *F16L 15/006* (2013.01); *F04C 18/0215* (2013.01); *F04C 2240/806* (2013.01); *F04C 2240/809* (2013.01)

(58) Field of Classification Search
CPC ............................ F04C 23/008; E21B 17/042
USPC ......... 417/426, 902; 285/34, 291.2, 333, 276; 62/192, 193, 468, 510
See application file for complete search history.

(56) References Cited

U.S. PATENT DOCUMENTS

| | | | | |
|---|---|---|---|---|
| 2,350,017 | A * | 5/1944 | Davis | 285/342 |
| 4,729,228 | A * | 3/1988 | Johnsen | 62/510 |
| 5,447,420 | A | 9/1995 | Caillat et al. | |
| 6,017,205 | A | 1/2000 | Weatherston et al. | |
| 6,162,033 | A | 12/2000 | Moore, Jr. et al. | |
| 6,289,532 | B1 * | 9/2001 | Fritz et al. | 4/679 |
| 7,097,435 | B2 * | 8/2006 | Erisgen et al. | 417/434 |
| 7,179,061 | B2 * | 2/2007 | Horton et al. | 417/220 |
| 7,309,084 | B2 * | 12/2007 | Cooke, Jr. | 285/354 |
| 8,408,024 | B2 * | 4/2013 | Ogata et al. | 62/402 |
| 2009/0250926 | A1 * | 10/2009 | Khemakhem et al. | 285/333 |
| 2010/0092320 | A1 | 4/2010 | Duppert | |

* cited by examiner

*Primary Examiner* — Devon Kramer
*Assistant Examiner* — Patrick Hamo
(74) *Attorney, Agent, or Firm* — Harness, Dickey & Pierce, P.L.C.

(57) ABSTRACT

A universal oil fitting may include a body and an orifice. The body may include a first end, a second end, a first outer portion and a second outer portion. The first outer portion may include external threads and may extend longitudinally between the first end and the second outer portion. The orifice may extend longitudinally through the body and may include a first portion having a first inner diameter and a second portion having a threaded second inner diameter. The first portion may extend longitudinally between the first end of the outer body and the second portion.

18 Claims, 9 Drawing Sheets

UNIVERSAL OIL FITTING

CROSS-REFERENCE TO RELATED APPLICATIONS

This application claims the benefit of U.S. Provisional Application No. 61/319,122, filed on Mar. 30, 2010. The entire disclosure of the above application is incorporated herein by reference.

FIELD

The present disclosure relates to an oil fitting, and more particularly, to a universal oil fitting for a compressor.

BACKGROUND

This section provides background information related to the present disclosure and is not necessarily prior art.

A climate control system such as, for example, a refrigeration system, a heat pump system, or an air conditioning system, includes one or more compressors circulating a working fluid through a fluid circuit. Each compressor may include an oil sump containing oil to lubricate and cool various components within the compressor. A shell of the compressor may include an opening in fluid communication with the oil sump. A valve may be fluidly connected to the opening and may be movable between open and closed positions to selectively allow oil to be added or extracted from the oil sump.

In a multiple compressor system, the oil sumps of two or more of the compressors may be in fluid communication with each other via an oil equalization conduit. Oil may be transferred between the compressors through the oil equalization conduit to equalize oil levels in the respective oil sump of each compressor, thereby ensuring that an oil level in any one compressor does not fall below a predetermined level. The oil equalization conduit may be fluidly coupled with the opening in the shell in one of a variety of ways such as brazing the conduit directly to a fitting or connecting the conduit to the fitting via an intermediate connector, for example.

SUMMARY

This section provides a general summary of the disclosure, and is not a comprehensive disclosure of its full scope or all of its features.

The present disclosure provides a universal oil fitting that includes a body and an orifice. The body may include a first end, a second end, a first outer portion and a second outer portion. The first outer portion may include external threads and may extend longitudinally between the first end and the second outer portion. The orifice may extend longitudinally through the body and may include a first portion having a first inner diameter and a second portion having a threaded second inner diameter. The first portion may extend longitudinally between the first end of the outer body and the second portion.

In some embodiments, the body may include an annular recess disposed between the first outer portion and the second outer portion. The annular recess may be disposed longitudinally adjacent to the first portion of the orifice. The body may include a third outer portion disposed between the annular recess and the second outer portion. The first, second and third outer portions may include first, second and third outer diameters, respectively. In some embodiments, the first outer diameter may be larger than the second and third outer diameters.

In some embodiments, the orifice may include a third portion extending between the second portion and the second end.

In some embodiments, the first end may include an annular groove at least partially surrounding the orifice.

The present disclosure also provides a compressor that may include a shell, a compression mechanism, an oil sump, and a fitting. The compression mechanism and the oil sump may be disposed within the shell. An aperture may extend through the shell and may be in fluid communication with the oil sump. The fitting may include a body and an orifice extending longitudinally therethrough for fluid communication with the oil sump. The body may include a first end, a second end, a first outer portion and a second outer portion engaging the aperture. The first outer portion may include an external thread pattern and may extend longitudinally between the first end and the second outer portion. The orifice may include a first portion having a first inner diameter and a second portion having a threaded second inner diameter. The first portion may extend longitudinally between the first end of the outer body and the second portion.

In some embodiments, the fitting may be welded or otherwise connected to the shell. A Schrader valve may threadably engage the second portion of the orifice.

The present disclosure also provides a system that may include first and second compressors, an oil conduit, and first and second fittings. The first compressor includes a first shell, a first compression mechanism, and a first oil sump. The second compressor includes a second shell, a second compression mechanism, and a second oil sump. The oil conduit may communicate oil between the first and second oil sumps. The first and second fittings may fluidly couple the oil conduit to the first and second oil sumps, respectively. Each of the first and second fittings may include a body and an orifice extending longitudinally therethrough. The body may include a first end, a second end, a first outer portion and a second outer portion. The first outer portion may include external threads and may extend longitudinally between the first end and the second outer portion. The orifice may include a first portion having a first inner diameter and a second portion having a threaded second inner diameter. The first portion may extend longitudinally between the first end of the outer body and the second portion.

In some embodiments, the oil conduit may be brazed into engagement with the first and second fittings. The first and second fittings may be welded to or otherwise engage the first and second shells, respectively.

The first and second shells may include first and second diameters, respectively, and the first and second fittings may include first and second lengths, respectively. The first diameter may be larger than the second diameter, and the second length may be longer than the first length.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 1:
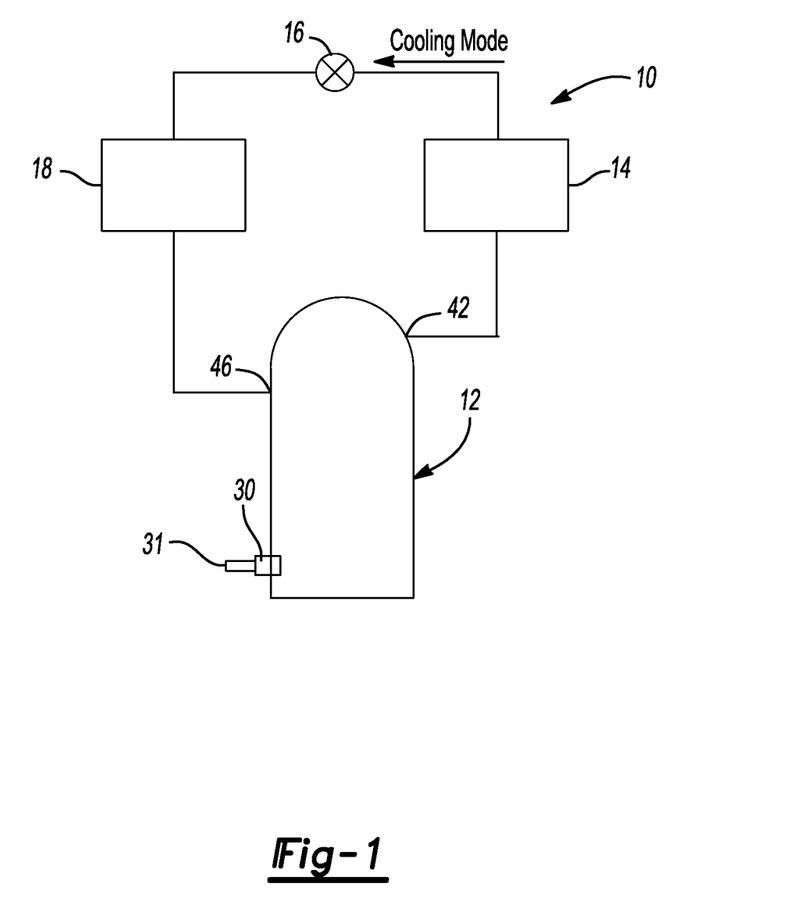
FIG. 1 is a schematic representation of a fluid compression circuit according to the principles of the present disclosure.

With reference to FIG. 1, a fluid compression system 10 is provided and may include a compressor 12, an outdoor heat exchanger 14, an expansion device 16, and an indoor heat exchanger 18. A working fluid, such as a refrigerant, for example, cycles through the system 10 under pressure from the compressor 12 and circulates between the outdoor heat exchanger 14 and the indoor heat exchanger 18 to reject and absorb heat. In a cooling mode, the outdoor heat exchanger 14 functions as a condenser and the indoor heat exchanger 18 functions as an evaporator. The expansion device 16 may be an expansion valve or a capillary tube, for example.

While the system 10 is shown in FIG. 1 as a cooling system, the system 10 could be a heat pump system having a four-way valve (not shown) operable to selectively reverse a direction of fluid flow through the system 10 to operate the system 10 in a heating mode. In the heating mode, the indoor heat exchanger 18 receives compressed fluid from the compressor 12 and functions as a condenser and the outdoor heat exchanger 14 functions as an evaporator.

Referring now to FIGS. 1-4, the compressor 12 may include a shell assembly 20, an upper bearing housing assembly 22, a lower bearing housing assembly 23, a motor assembly 24, a compression mechanism 26, an oil sump 28, an oil fitting 30, and a valve 31. The shell assembly 20 may house the upper and lower bearing housing assemblies 22, 23, the motor assembly 24, the compression mechanism 26, and the oil sump 28. The shell assembly 20 generally forms a compressor housing and may include a cylindrical shell 32, an end cap 34 at the upper end thereof, a generally transversely extending partition 36, and a base 38 at a lower end thereof. The end cap 34 and partition 36 may generally define a discharge chamber 40. The discharge chamber 40 may form a discharge muffler for the compressor 12. A discharge port 42 is attached to the shell assembly 20 at a first opening 44 in the end cap 34. A suction port 46 may be attached to the shell assembly 20 at a second opening 48. The partition 36 may include a discharge passage 50 extending therethrough to provide fluid communication between the compression mechanism 26 and the discharge chamber 40. A discharge valve 52 may be disposed in the discharge passage 50 to prevent a reverse flow condition. The base 38 may include a third opening 53 in communication with the oil sump 28. The oil fitting 30 may engage the third opening 53 for fluid communication with the oil sump 28.

Figure 2:
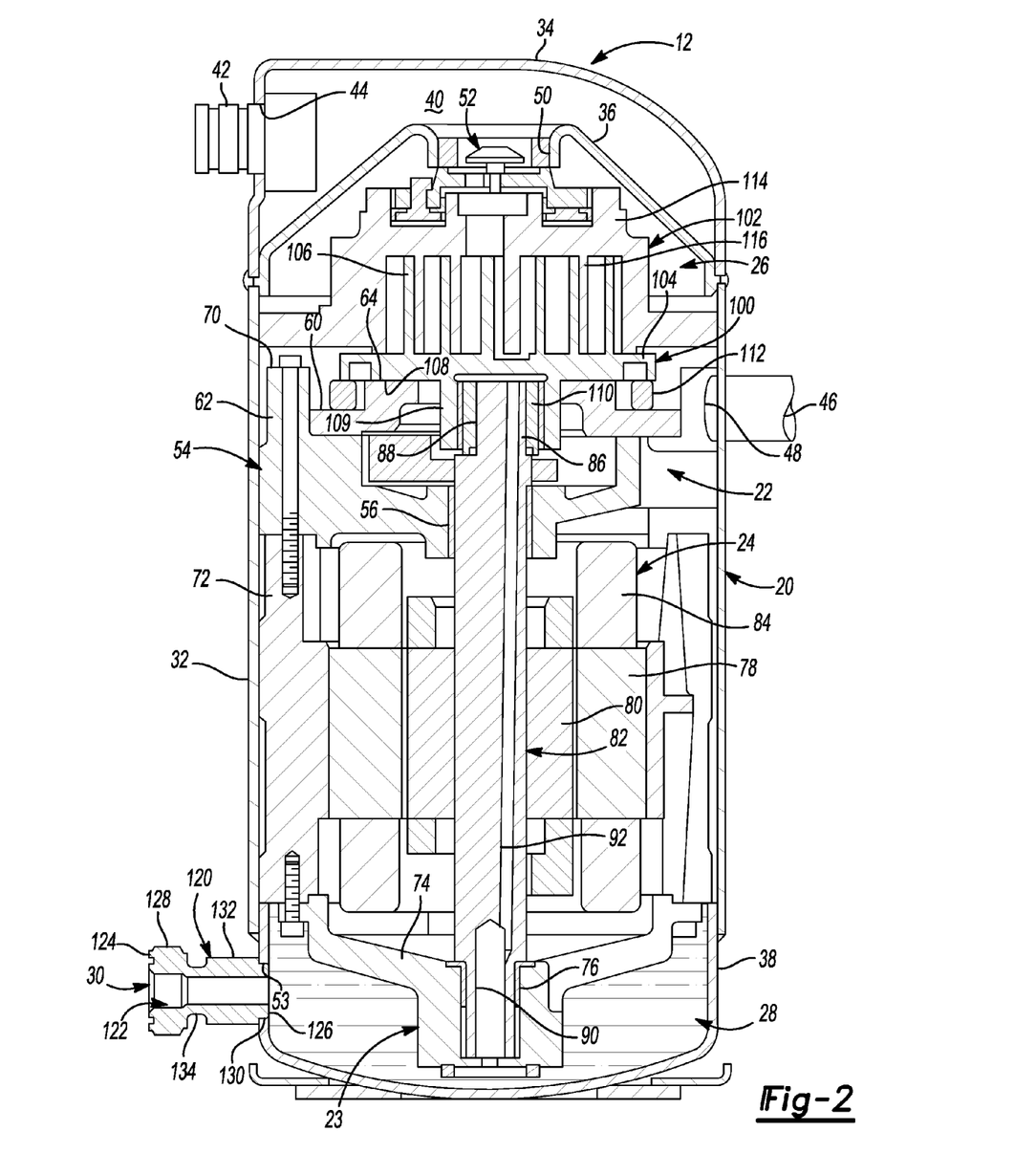
FIG. 2 is a cross-sectional view of a compressor having the oil fitting according to the principles of the present disclosure.

The upper bearing housing assembly 22 may be affixed to a stator housing 72 and/or the shell 32. The upper bearing housing assembly 22 may include an upper bearing housing 54 and an upper bearing 56 disposed therein. The upper bearing housing 54 may include a first portion 60 and a second portion 62. The first portion 60 may define an annular flat thrust bearing surface 64 on an axial end surface thereof. The second portion 62 may house the upper bearing 56 therein and may include a plurality of arms 70 secured to the stator housing 72 and/or the shell 32.

The lower bearing housing assembly 23 may be disposed at or near a lower portion of the shell assembly 20 and may include a lower bearing housing 74 and a lower bearing 76. The lower bearing housing 74 may be fixedly secured to the shell assembly 20 and/or the stator housing 72. The lower bearing 76 may be received within a recess in the lower bearing housing 74.

The motor assembly 24 generally includes a motor stator 78, a rotor 80, and a drive shaft 82. Windings 84 pass through the stator 78. The stator 78 may be press fit into the stator housing 72 or directly into the shell 32. The drive shaft 82 is rotatably driven by the rotor 80. The upper bearing 56 and the lower bearing 76 support the drive shaft 82 for rotation relative to the stator 78. The drive shaft 82 may include an eccentric crank pin 86 having a flat 88 thereon. The drive shaft 82 may also include a relatively large diameter concentric bore 90 and a radially outwardly positioned smaller diameter eccentric bore 92 extending generally upwardly from the concentric bore 90 to the top of the drive shaft 82. The eccentric bore 92 is in fluid communication with the concentric bore 90.

The compression mechanism 26 may generally include an orbiting scroll 100 and a non-orbiting scroll 102. The orbiting scroll 100 may include an end plate 104 having a spiral wrap 106 on the upper surface thereof and an annular flat thrust surface 108 on the lower surface. The thrust surface 108 may interface with the annular flat thrust bearing surface 64 on the upper bearing housing 54. A cylindrical hub 109 may project downwardly from the thrust surface 108 and may have a drive bushing 110 rotatively disposed therein. The drive bushing 110 may include an inner bore in which the crank pin 86 is drivingly disposed. The crank pin flat 88 may drivingly engage a flat surface in a portion of the inner bore of the drive bushing 110 to provide a radially compliant driving arrangement. An Oldham coupling 112 may be engaged with the orbiting and non-orbiting scrolls 100, 102 to prevent relative rotation therebetween.

The non-orbiting scroll 102 may include an end plate 114 having a spiral wrap 116 on a lower surface thereof, a discharge passage 118 extending through the end plate 114. The spiral wrap 116 may form a meshing engagement with the spiral wrap 106 of the orbiting scroll 100, thereby creating a series of moving pockets. The pockets created by the spiral wraps 106, 116 may decrease in volume as they move from a radially outer position to a radially inner position throughout a compression cycle of the compression mechanism 26.

The oil sump 28 may be at least partially defined by a lower portion of the interior of the shell assembly 20 including the base 38 and/or shell 32. The oil sump 28 may be filled with lubricating oil to a predetermined level. The concentric bore 90 and eccentric bore 92 of the drive shaft 82 may be in fluid communication with the oil sump 28 such that rotation of the drive shaft 82 may pump oil from the oil sump 28 through the bores 90, 92 to the compression mechanism 26 and to various other components of the compressor 12 that require lubrication.

While the compressor 12 is described above as being a scroll compressor, in other embodiments, the compressor 12 could be a reciprocating compressor, for example, or any other type of compressor.

Figure 3:
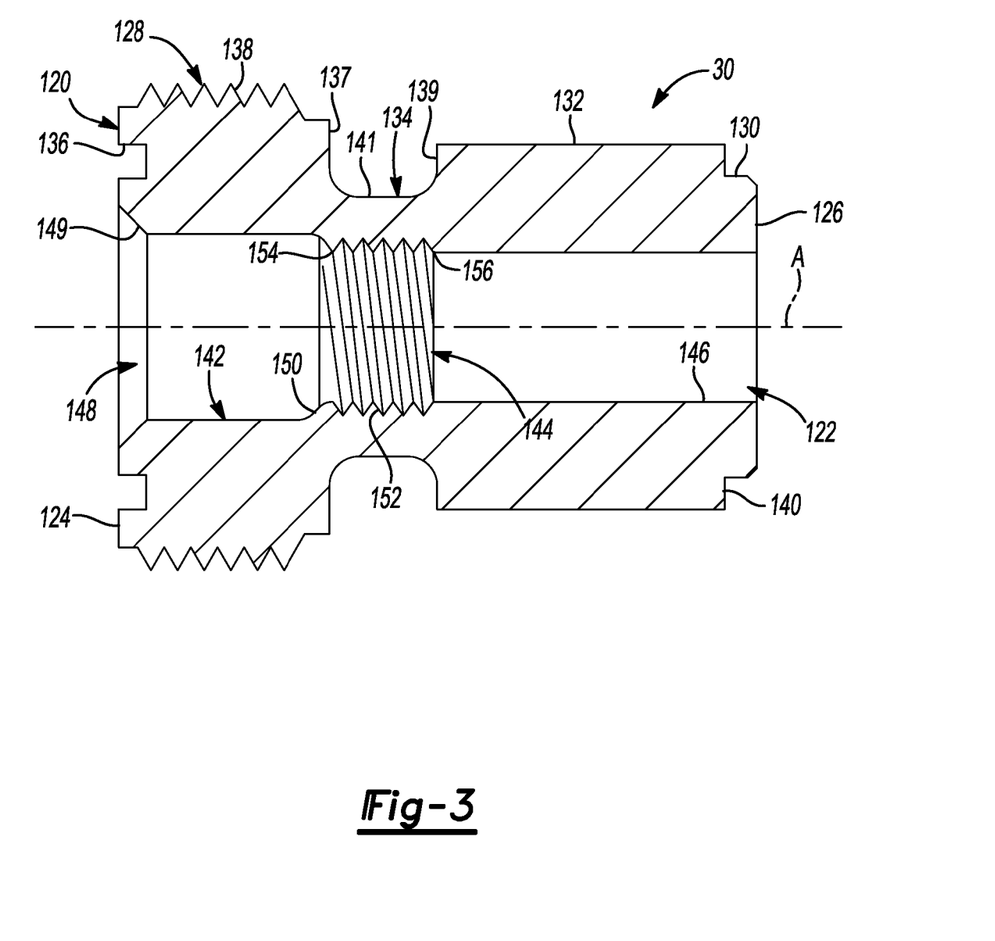
FIG. 3 is a cross-sectional view of the oil fitting according to the principles of the present disclosure.

The oil fitting 30 may be formed from steel, cast iron, or any other metal, and includes a body 120 and an aperture or orifice 122 extending through the body 120. Some or all of the body 120 and/or orifice 122 may include nickel plating or other surface treatment. The body 120 and the orifice 122 may be rotationally symmetric about a longitudinal axis A, as shown in FIG. 3. In some embodiments, however, one or more features of the body 120 and/or orifice 122 may be rotationally asymmetric. The body 120 may include a first end 124, a second end 126, a first outer portion 128, a second outer portion 130, a third outer portion 132, and an annular recess 134. The first end 124 may be generally annular and may be defined by an outer diameter of the first outer portion 128 and the orifice 122. An annular groove 136 may be formed in the first end 124 and may be disposed radially outward relative to the orifice 122 to at least partially surround the orifice 122.

The first outer portion 128 may extend longitudinally between the first end 124 and the annular recess 134. The outer diameter of the first outer portion 128 may be larger than one or both of outer diameters of the second and third outer portions 130, 132. External threads 138 may be formed in the outer diameter of the first outer portion 128 and may extend at least partially between the first end 124 and the annular recess 134.

The second outer portion 130 may extend between the second end 126 and the third outer portion 132. The outer diameter of the second outer portion 130 may be smaller than the outer diameter of the third outer portion 132. The third outer portion 132 may extend between the annular recess 134 and the second outer portion 130. The second outer portion 130 may be received in the third opening 53 in the base 38 of the shell assembly 20 such that an end face 140 of the third outer portion 132 abuts an outer surface of the base 38. The second and/or third outer portions 130, 132 may be welded (e.g., MIG welded) or otherwise suitably joined to the base 38. In this manner, the body 120 of the oil fitting 30 may be sealingly engaged with the third opening 53 of the base 38 while allowing fluid communication between the oil sump 28 and the orifice 122 of the oil fitting 30. In some embodiments, the second and third outer portions 130, 132 may be a continuous, unitary portion and may cooperate to form a substantially constant outer diameter.

The annular recess 134 may be disposed between the first outer portion 128 and the third outer portion 132. The annular recess 134 may include first and second end surfaces 137, 139 and a longitudinally extending surface 141 forming a generally U-shaped cross section. The U-shaped cross section reduces the wall thickness of the body 120 at the annular recess 134 relative to the wall thicknesses at the first, second, and third outer portions 128, 130, 132.

The orifice 122 may include a first portion 142, a second portion 144, and a third portion 146. The first portion 142 may be generally smooth-bored and may extend longitudinally between the first end 124 and the second portion 144. The first portion 142 may include a first end 148 having a countersink portion 149 and a second end 150. A diameter of the first portion 142 may be larger than a diameter of the second portion 144. The length of the first portion 142 may be approximately equal to the length of the first outer portion 128. Accordingly, the first end surface 137 of the annular recess 134 of the body 120 may be substantially longitudinally aligned or longitudinally adjacent to the second end 150 of the first portion 142.

The second portion 144 may extend longitudinally between the first portion 142 and the third portion 146. The second portion 144 may include internal threads 152 having a first end 154 and a second end 156. The first end 154 may be adjacent to the second end 150 of the first portion 142. The second end 156 may be adjacent to the third portion 146. Stated another way, the internal threads 152 may extend longitudinally from the second end 150 of the first portion 142 beyond the second end surface 139 of the annular recess 134 to the third portion 146. In some embodiments, the third portion may be generally smooth-bored. In other embodiments, the internal threads 152 may extend longitudinally through some or all of the second and third portions 142, 144.

As described above, the second outer portion 130 and/or the third outer portion 132 of the body 120 may be welded to the shell assembly 20. Heat from the welding process will conduct through the body 120 of the oil fitting 30. Accordingly, the lengths of the third outer portion 132 and the third portion 146 of the orifice 122 as well as the wall thicknesses between the third outer portion 132 and the second and third portions 144, 146 of the orifice 122 are sufficiently large to prevent heat from the welding process from distorting or otherwise compromising the internal threads 152 of the second portion 144 of the orifice 122. Minimum lengths and wall thicknesses to prevent such distortion may be predetermined at least partially based on the thermal conductivity of the material of the oil fitting 30 and the amount of heat generated during the welding process.

The valve 31 may be a Schrader valve, for example, or any other type of valve selectively allowing fluid flow therethrough. The valve 31 may include a body 160, an orifice 162 and a selectively movable valve mechanism 164 (shown schematically in FIG. 4) disposed within the orifice 162. The body 160 may include a stem portion 166 having external threads 168. The external threads 168 may matingly engage the internal threads 152 of the orifice 122 of the oil fitting 30 to form a sealed connection between the oil fitting 30 and the valve 31. An annular sealing member such as an O-ring 147 may be seated in the countersink portion 149 and may sealingly engage the oil fitting 30 and the valve 31.

Figure 4:
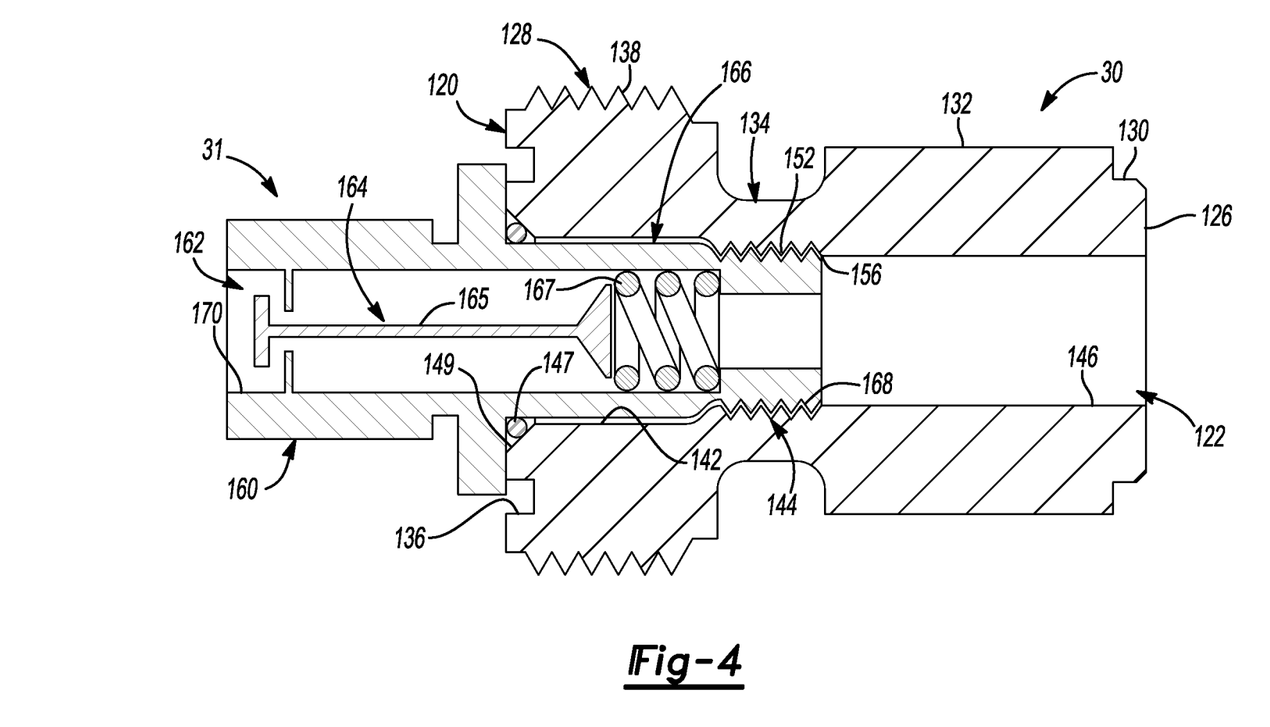
FIG. 4 is a cross-sectional view of the oil fitting engaging a Schrader valve according to the principles of the present disclosure.

The valve mechanism 164 may be a poppet valve or other suitable mechanism. The valve mechanism 164 may include a movable valve member 165 and a biasing member 167, for example, to selectively allow and restrict or prevent fluid communication between a distal end 170 of the orifice 162 of the valve 31 and the oil sump 28. The valve 31 allows oil to be selectively added or removed from the oil sump 28 throughout the operational life of the compressor 12 to maintain a predetermined amount of oil therein.

With reference to FIGS. 3 and 5-7, a system 200 is provided and may include substantially identical structure and function as the system 10, but may include one or both of the following differences. First, the system 200 may include two or more compressors 12 cooperating to circulate the working fluid throughout the system 200. Second, the compressors 12 may include an oil equalization conduit 202 connected to respective oil fittings 30 of the two or more compressors 12, rather than the valve 31 being connected to each oil fitting 30, as described above.

Figure 5:
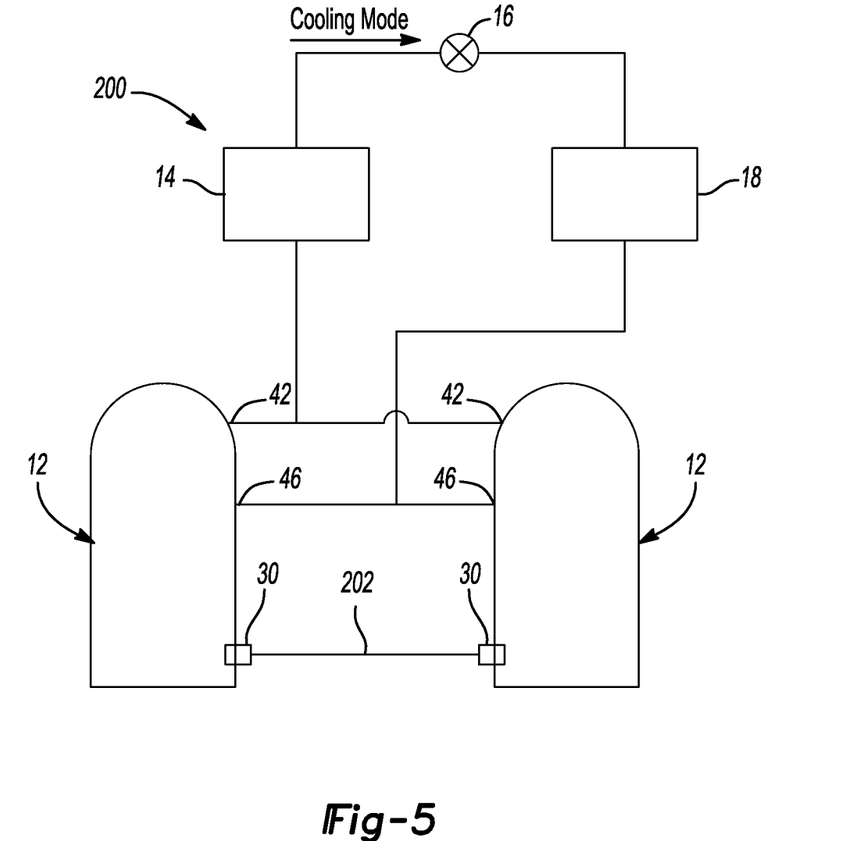
FIG. 5 is a schematic representation of another climate control system according to the principles of the present disclosure.

The oil equalization conduit 202 may be formed from a metallic material and may provide fluid communication between the oil sumps 28 of respective compressors 12. In this manner, oil may be transferred between the oil sumps 28 to maintain a predetermined amount of oil in each compressor 12.

Figure 6:
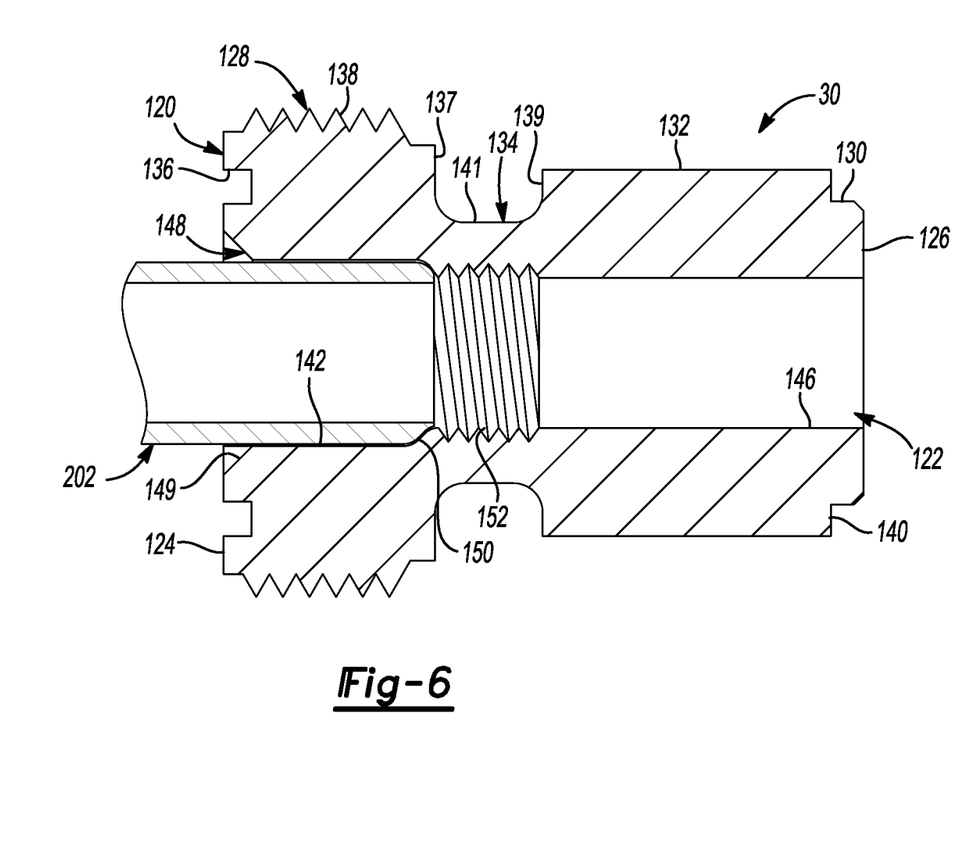
FIG. 6 is a cross-sectional view of the oil fitting engaging an oil conduit according to the principles of the present disclosure.

As shown in FIG. 6, an end of the oil equalization conduit 202 may be received in the first portion 142 of the orifice 122 of the oil fitting 30. The smaller diameter of the second portion 144 (relative to the larger diameter of the first portion 142) may function as a positive stop against which the end of the oil equalization conduit 202 may abut. The outer diameter of the oil equalization conduit 202 may be fixed to the first portion 142 by a brazing process, for example, or other suitable joining means.

The reduced wall thickness of the body 120 at the annular recess 134 allows sufficient conductive heat transfer to the first portion 142 of the orifice 122 to melt a filler material and facilitate proper brazing of the oil equalization conduit 202 to the first portion 142. Heat from a brazing torch (or other heat source) may be applied to the first outer portion 128 which will conduct through the body 120 to the surface of the first portion 142. The reduced wall thickness of the body 120 at the annular recess 134 and the distance of the annular recess 134 to the weld connecting the oil fitting 30 to the shell assembly 20 (i.e., the length of the third outer portion 132) prevents an excessive amount of heat from conducting to the shell assembly 20 during the brazing process (thereby reducing or preventing damage to the shell assembly 20), and maintains heat in the first portion 142 to enable the first portion 142 to reach a sufficiently high temperature for brazing the oil equalization conduit 202 therein.

Figure 7:
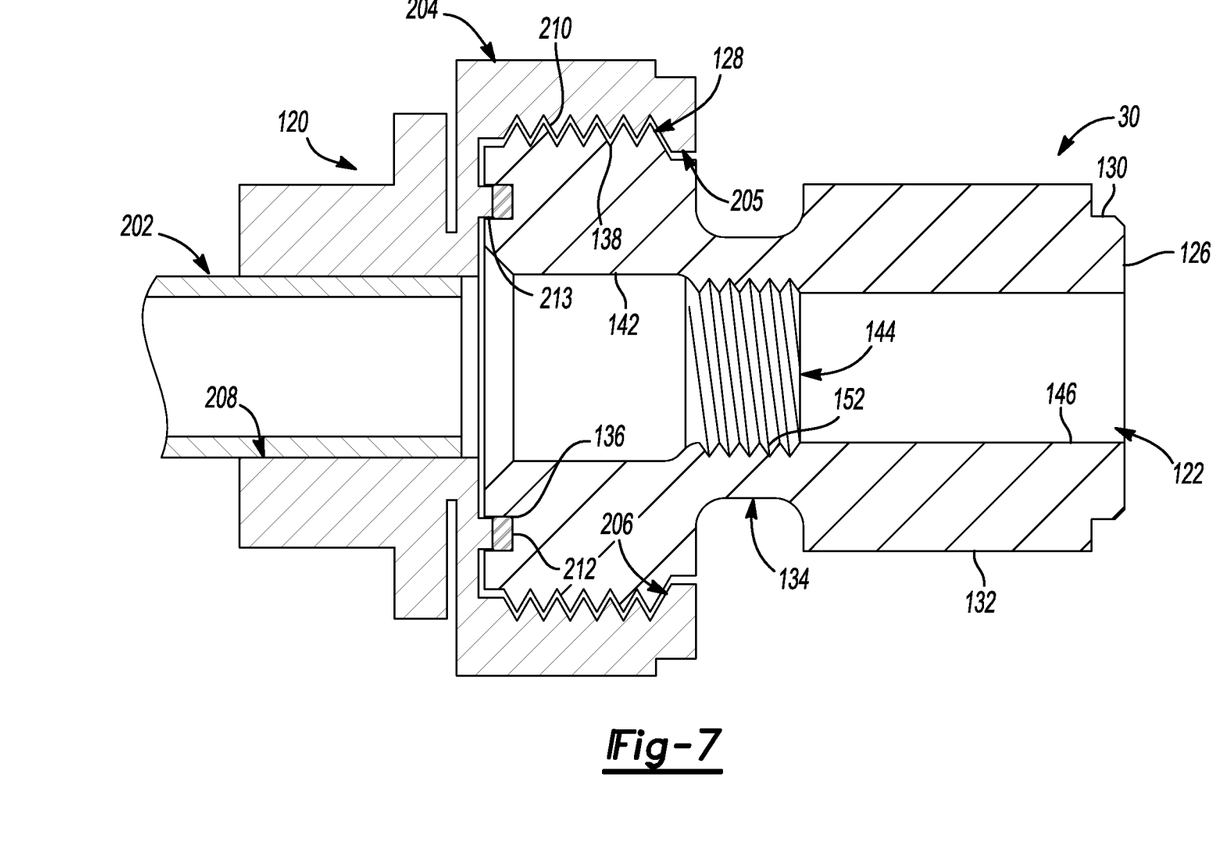
FIG. 7 is a cross-sectional view of the oil fitting engaging a connector according to the principles of the present disclosure.

As shown in FIG. 7, the oil equalization conduit 202 may be connected to the oil fitting 30 by an intermediate connector 204, rather than by brazing the oil equalization conduit 202 directly to the oil fitting 30, as described above. The intermediate connector 204 may be a Rotalock™ fitting, for example, and may include an orifice 205 having a first end 206 and a second end 208. The first end 206 may include internal threads 210. The internal threads 210 may matingly engage the external threads 138 of the first outer portion 128 of the oil fitting 30. An annular sealing member 212 may be seated in the annular groove 136 of the first end 124 of the oil fitting 30. The sealing member 212 may be a polytetrafluoroethylene ring having a square, rectangular, or round cross section, for example. The intermediate connector 204 may include an annular protrusion 213 abutting the sealing member 212. The sealing member 212 may provide a sealed relationship between the intermediate connector 204 and the oil fitting 30 while allowing fluid communication between the orifice 122 of the oil fitting 30 and the second end 208 of the orifice 205 of the intermediate connector 204.

The oil equalization conduit 202 may be received in the second end 208 of the intermediate connector 204 to provide fluid communication between the oil equalization conduit 202 and the intermediate connector 204. The oil equalization conduit 202 may be fixed therein via any suitable joining process, such as sweating, brazing, or soldering, for example.

As described above, the external threads 138 of the first outer portion 128 of the oil fitting 30 allows for threaded connection to the intermediate connector 204 (FIG. 7), the first portion 142 of the orifice 122 allows for brazed connection to the oil equalization conduit 202 (FIG. 6), and the internal threads 152 of the second portion 144 of the orifice 122 allows for threaded connection to the valve 31 (FIG. 4). Accordingly, the oil fitting 30 is a multi-functional, universal fitting that can be interchangeably used to connect to the valve 31 or the intermediate connector 204 and/or the oil equalization conduit 202 without modification. Furthermore, the oil fitting 30 can be interchangeably incorporated into the system 10 and the system 200 without modification. In this manner, a single fitting design can be manufactured for multiple applications, thereby reducing manufacturing costs of the system 10 and the system 200.

Figure 8:
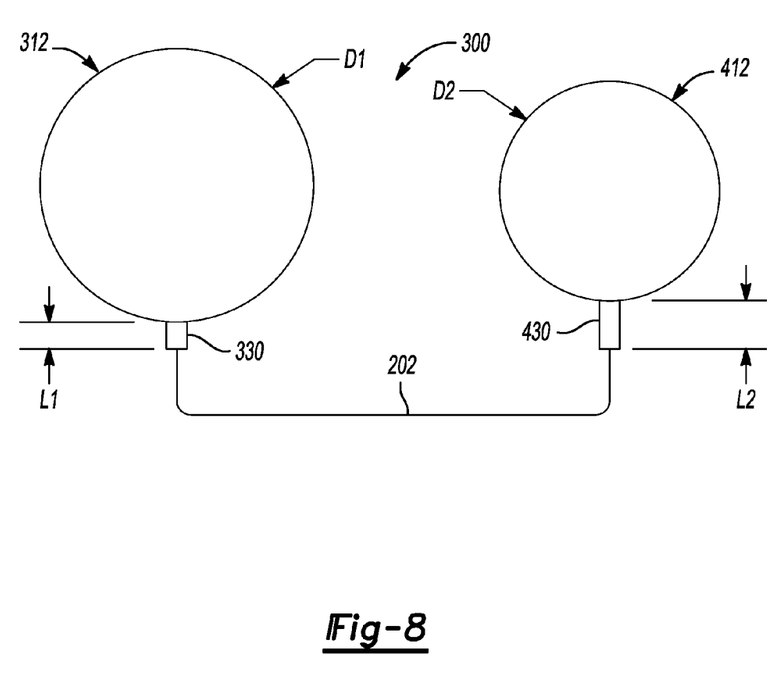
FIG. 8 is a schematic representation of first and second compressors having first and second oil fittings.
Figure 9:
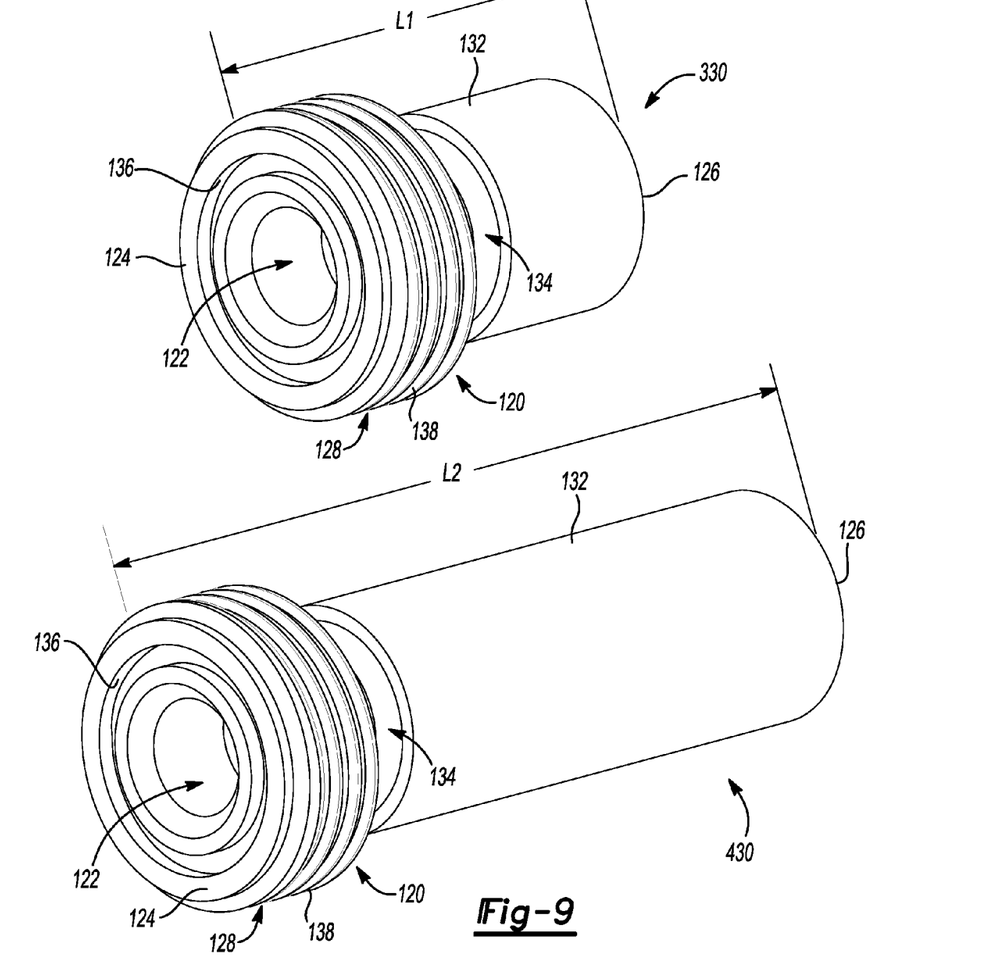
FIG. 9 is a perspective view of the first and second oil fittings of FIG. 8.

Referring now to FIGS. 8 and 9, a tandem compressor system 300 is provided and may include a first compressor 312 and a second compressor 412. The tandem compressor system 300 could be incorporated into a heating and/or cooling system such as the system 200 described above. The first and second compressors 312, 412 may be in fluid communication with each other via the oil equalization conduit 202. The oil equalization conduit 202 may be connected to the first and second compressors 312, 412 by first and second oil fittings 330, 430. The structures and functions of the first and second compressors 312, 412, the oil equalization conduit 202, and the first and second oil fittings 330, 430 may be substantially similar to that of the compressor 12 and oil fitting 30 described above.

The first compressor 312 may have a larger first diameter D1, and the second compressor 412 may have a smaller second diameter D2. The first oil fitting 330 may include a first length L1, and the second oil fitting 430 may include a longer second length L2. The longer length L2 of the second oil fitting 430 compensates for the smaller diameter D2 of the second compressor 412 and may substantially align the first ends 124 of the first and second oil fittings 330, 430 with each other relative to corresponding ends of the oil equalization conduit 202. The respective lengths of third outer portions 132 of the first and second oil fittings 330, 430 may account for the difference between the first and second lengths L1, L2.

While the fittings 30, 330, 430 are described above as engaging the shell assemblies 20 of the compressors 12, 312, 412 to provide fluid communication with the oil sump 28 disposed within the compressors 12, 312, 412, in some embodiments, the oil sump 28 may be an external sump. That is, the oil sump 28 may be disposed outside of the shell assembly 20 of the compressor 12, 312, 412. Furthermore, while the fittings 30, 330, 430 are described above as being fittings providing communication of oil or some other lubricant into and out of the sump, in other embodiments, the fittings 30, 330, 430 could be used as universal fittings for communication of any other fluid into and/or out of any other structure.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. A fitting comprising:
a body including a first end, a second end, a first outer portion, a second outer portion and a third outer portion, said first outer portion having external threads and extending longitudinally between said first end and said second outer portion; and
an orifice extending longitudinally through said body and including a first portion having a first inner diameter and a second portion having a threaded second inner diameter, said first portion extending longitudinally between said first end of said body and said second portion,
wherein said first outer portion includes a first outer diameter and said second outer portion includes a second outer diameter, said first outer diameter is larger than said second outer diameter,
wherein said body includes an annular recess disposed between said first outer portion and said second outer portion, said third outer portion disposed between said annular recess and said second outer portion, said third outer portion having a third outer diameter that is larger than said second outer diameter,
wherein said orifice includes a third portion extending between said second portion and said second end, said third portion having a third inner diameter that is smaller than said first and second inner diameters, said second portion disposed between said first and third portions, said third portion extending longitudinally through said second end of said body.

2. The fitting of claim 1, wherein said annular recess is disposed longitudinally adjacent to said first portion of said orifice.

3. The fitting of claim 1, wherein said first outer diameter is larger than said third outer diameter.

4. The fitting of claim 1, wherein said first end includes an annular groove at least partially surrounding said orifice.

5. The fitting of claim 1, wherein said second outer diameter is smaller than a minor diameter of said external threads of said first outer portion.

6. A compressor comprising:
a shell including an aperture extending therethrough;
a compression mechanism disposed within said shell;
an oil sump disposed within said shell and in fluid communication with said aperture; and
a fitting including a body and an orifice extending longitudinally therethrough for fluid communication with said oil sump, said body having a first end, a second end, a first outer portion, a second outer portion and a third outer portion, said first outer portion having an external thread pattern and extending longitudinally between said first end and said second outer portion, said second outer portion engaging said aperture, said orifice including a first portion having a first inner diameter and a second portion having a threaded second inner diameter, said first portion extending longitudinally between said first end of said outer body and said second portion,
wherein said first outer portion includes a first outer diameter and said second outer portion includes a second outer diameter, said first outer diameter is larger than said second outer diameter,
wherein said body of said fitting includes an annular recess disposed between said first outer portion and said second outer portion, said third outer portion disposed between said annular recess and said second outer portion, said third outer portion having a third outer diameter that is larger than said second outer diameter,
wherein said orifice includes a third portion extending between said second portion and said second end, said third portion having a third inner diameter that is smaller than said first and second inner diameters, said second portion disposed between said first and third portions, said third portion extending longitudinally through said second end of said body.

7. The compressor of claim 6, wherein said annular recess is disposed longitudinally adjacent to said first portion of said orifice.

8. The compressor of claim 6, wherein a length of said third outer portion at least partially thermally isolates said second outer portion from said threaded second inner diameter.

9. The compressor of claim 6, wherein said first outer diameter is larger than said third outer diameter.

10. The compressor of claim 6, wherein said first end includes an annular groove at least partially surrounding said orifice.

11. The compressor of claim 10, further comprising an annular sealing member engaging said annular groove.

12. The compressor of claim 6, wherein said fitting is welded to said shell.

13. The compressor of claim 6, further comprising a Schrader valve threadably engaging said second portion of said orifice.

14. The compressor of claim 6, wherein said second outer diameter is smaller than a minor diameter of said external threads of said first outer portion.

15. A system comprising:
- a first compressor having a first shell, a first compression mechanism, and a first oil sump;
- a second compressor having a second shell, a second compression mechanism, and a second oil sump;
- an oil conduit communicating oil between said first and second oil sumps; and
- first and second fittings fluidly coupling said oil conduit to said first and second oil sumps, respectively, each of said first and second fittings including a body and an orifice extending longitudinally therethrough, said body having a first end, a second end, a first outer portion and a second outer portion, said first outer portion having external threads and extending longitudinally between said first end and said second outer portion, said orifice including a first portion having a first inner diameter and a second portion having a threaded second inner diameter, said first portion extending longitudinally between said first end of said outer body and said second portion,
wherein said first and second fittings engage said first and second shells, respectively, said first and second shells including first and second diameters, respectively, said first and second fittings including first and second lengths, respectively, said first diameter being larger than said second diameter, and said second length being longer than said first length.

16. The system of claim 15, wherein said oil conduit is brazed into engagement with said first and second fittings.

17. The system of claim 15, wherein said first and second fittings are welded to said first and second shells, respectively.

18. The system of claim 15, wherein said first outer portion includes a first outer diameter and said second outer portion includes a second outer diameter, said first outer diameter is larger than said second outer diameter, said second outer diameter is smaller than a minor diameter of said external threads of said first outer portion.

* * * * *